United States Patent [19]
Bellamy et al.

[11] Patent Number: 5,443,245
[45] Date of Patent: Aug. 22, 1995

[54] HYDRAULIC ANTI-VIBRATION SUPPORTS

[75] Inventors: Alain Bellamy, Naveil; Emmanuel Blanchet; Pascal Richard, both of Chateaudun, all of France

[73] Assignee: Hutchinson, France

[21] Appl. No.: 142,123

[22] Filed: Oct. 28, 1993

[30] Foreign Application Priority Data

Nov. 2, 1992 [FR] France .................. 92 13097

[51] Int. Cl.[6] ........................................ F16F 5/00
[52] U.S. Cl. .......................... 267/140.13; 267/219
[58] Field of Search ............ 267/140.13, 141.1–141.3, 267/219; 248/562, 636

[56] References Cited

U.S. PATENT DOCUMENTS

| | | | |
|---|---|---|---|
| 4,159,091 | 6/1979 | Le Salver et al. | 267/140.13 |
| 4,647,023 | 3/1987 | Day et al. | 267/140.13 |
| 4,711,206 | 12/1987 | Andra et al. | 267/140.13 |
| 4,938,463 | 7/1990 | Miyamoto | 267/140.13 |
| 4,986,510 | 1/1991 | Bellamy et al. | 267/140.13 |
| 4,997,169 | 3/1991 | Nakamura et al. | 267/140.13 |
| 5,104,100 | 4/1992 | Simuttis | 267/140.13 |
| 5,139,240 | 8/1992 | Miyamoto | 267/140.13 |

FOREIGN PATENT DOCUMENTS

| | | |
|---|---|---|
| 0156697 | 10/1985 | European Pat. Off. . |
| 0307693 | 3/1989 | European Pat. Off. .... 267/140.13 |
| 0346227 | 12/1989 | European Pat. Off. . |
| 2392285 | 12/1978 | France . |
| 2674590 | 10/1992 | France . |

OTHER PUBLICATIONS

Patent Abstracts of Japan, vol. 12, No. 92 (M-679)(2938) 24 Mar. 1988 & JP-A-62 228 726 (Kinugawa) 7 Oct. 1987.

*Primary Examiner*—Robert J. Oberleitner
*Assistant Examiner*—Chris Schwartz
*Attorney, Agent, or Firm*—Larson and Taylor

[57] ABSTRACT

A hydraulic anti-vibration device includes two rigid frame members, an elastomer body, two sealed chambers, a constricted passage putting the two sealed chambers into communication with each other, a valve member that defines portions of the two chambers and that has an axis of revolution, and two grids between which the valve member is interposed. The grids limit displacements of the valve member. Interposed non-uniformities cause the amount of contact the valve member has with a grid to vary progressively and angularly around the central axis of the valve member. The non-uniformities are disposed around the central axis in a distribution that is angularly non-repetitive.

11 Claims, 2 Drawing Sheets

HYDRAULIC ANTI-VIBRATION SUPPORTS

FIELD OF THE INVENTION

The invention relates to anti-vibration devices for disposing between two rigid elements such as a vehicle chassis and a vehicle engine for damping and connection purposes, or even for support purposes.

BACKGROUND OF THE INVENTION

More particularly, amongst such devices, the invention relates to those comprising:
- two rigid frame members suitable for securing to respective ones of the two rigid elements to be united;
- an elastomer body interconnecting the two frame members and co-operating therewith to form, at least in part, two sealed chambers;
- a constricted passage keeping the two chambers permanently in communication with each other;
- a mass of liquid filling the two chambers and the constricted passage;
- a valve member in the form of a plate of elastically deformable material defining in part at least one of the two chambers and another chamber which is preferably the second of said two chambers, said valve member having an axis of revolution or the like; and
- at least one rid limiting the displacements of said valve member.

As is known, in such a device, vibration at high frequency and low amplitude, such as the vibration generated by the engine while it is idling, gives rise to a rapid succession of reciprocating deformations of the valve member perpendicularly to itself and suitable for attenuating transmission of the vibration in question.

In contrast, when oscillations are greater in amplitude and lower in frequency, such as the oscillations due to round irregularities and to changes in slope while the vehicle is travelling on the ground the deformations of the valve member reach a maximum possible amplitude and the liquid is transferred from one of the two chambers to the other and back again through the constricted passage, with the mass of liquid driven in this way being caused to resonate when the frequency of the oscillations reaches a predetermined value that is a function of the ratio between the axial length and the right cross-section of the constricted passage. Such resonance serves to provide the desired damping of the oscillations concerned.

The discontinuities in the reciprocating displacements of the valve member, and in particular those due to limits put on valve member displacement by the grid which is associated therewith, give rise to banging and unwanted noise that can be objectionable. This applies in particular to devices fitted to up-market vehicles where it is desired to make their passenger compartments as silent as possible.

A main object of the invention is to mitigate that drawback.

In its French patent application filed under the number 91 03579, the Applicant has already proposed an anti-vibration device of the above-specified type, in which the faces of the valve member include bulges that are integral therewith. During operation of the valve member, the bulges are progressively compressed against the grids that limit displacement of the valve member, after which they expand elastically. More precisely, because of the presence of said bulges, the valve member does not press in an angularly uniform manner against the grids, but is subjected to circumferential undulating deformation: the sections of the valve member on either side of the bulges do not press against the bearing surfaces of the grids as a uniform block, but make angularly progressive contact therewith.

In the embodiments described in the patent application, the outline of the valve member is circular and the bulges are disposed in annular rings, around which they are uniformly distributed.

Anti-vibration devices are also known in which the surfaces of the valve members have multiple projecting irregularities. Those irregularities are distributed over said surfaces in angularly uniform manner, and the presence thereof may lead to a certain amount of attenuation in the above-mentioned banging and unwanted noise.

Even greater attenuation of said banging and unwanted noise can be obtained using the anti-vibration devices proposed by this invention.

SUMMARY OF THE INVENTION

To this end, an anti-vibration device of the invention is of the kind specified above in the sense that it includes means for causing the valve member while in displacement to press against the grid in an angularly progressive manner, and it is characterized in that said means present angular non-uniformity which is not repetitive about the central axis. This angularly varying non-uniformity may be achieved, for example, from non-uniform presence of the means and varying radial lengths of the means.

Thus, any symmetry in the application of the valve member against the grid is interrupted.

The above device advantageously includes the various following features taken singly or in any combination that is technically possible:
- the non-uniform means are constituted at least in part by non-repetitive angular non-uniformity in at least one of the surfaces of the grid and of the valve member that come into mutual contact during displacements of said valve member;
- the surface non-uniformity is due to its general outline;
- the surface non-uniformity is due to the presence of at least one piece of relief projecting relative to its general outline;
- one such piece of relief extends over an angle that is no greater than one-fifth of the angle between the outline of the relief and the outline of the closest adjacent relief;
- at least one of the pieces of relief is a rib;
- at least one of the pieces of relief is a stud;
- the non-uniform surface is a contact surface of the grid;
- when the valve member is mounted with the possibility of limited deformation between two grids, the surface non-uniformity relates to one only of the two valve member and grid interfaces;
- the non-uniform means are constituted, at least in part, by non-repetitive angular non-uniformity in the stiffness of the valve member;
- the stiffness non-uniformity of the valve member is due to variations in its thickness;

the stiffness non-uniformity of the valve member is due to at least one insert of different stiffness being incorporated therein; and at least some of the non-uniform means are disposed close to at least one of the orifices through which the constricted passage opens out into the chambers.

The following description of a particular embodiment of the invention is purely illustrative and non-limiting. It should be read with reference to the accompanying drawings, in which:

DESCRIPTION OF THE PREFERRED EMBODIMENTS

Figure 1:
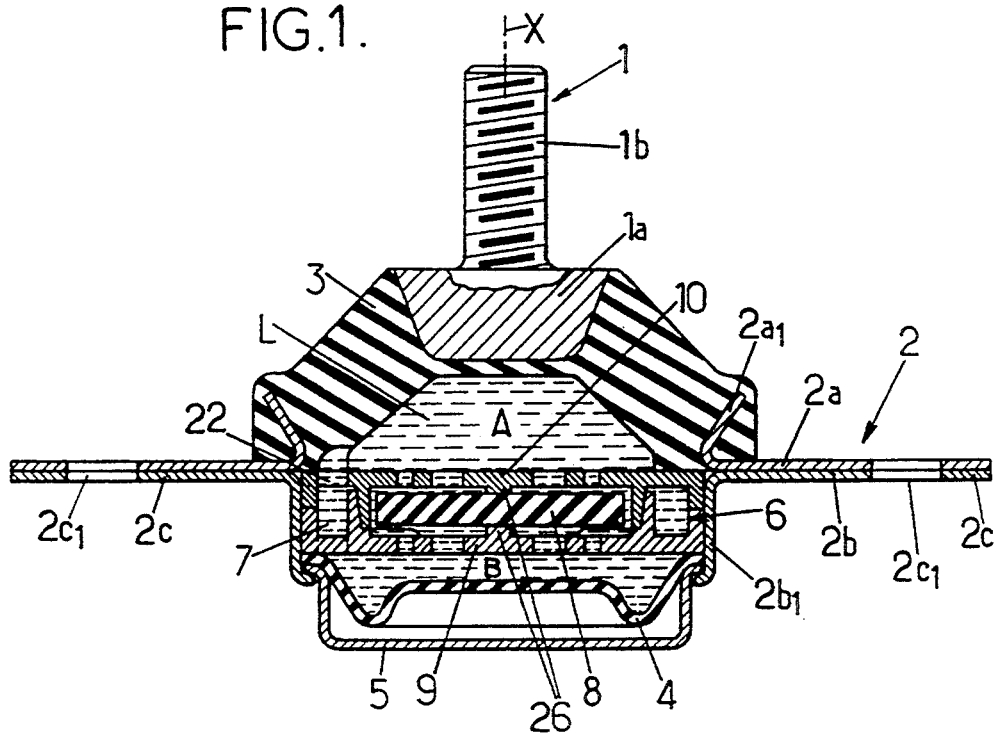
FIG. 1 is an axial section view through a hydraulic anti-vibration support constituting a particular embodiment of the invention.

As can be seen more particularly in FIG. 1, the device constituting this embodiment comprises, in conventional manner:

- a rigid base 1 comprising a central head $1a$ that is extended upwards by a threaded shank $1b$ ;
- a rigid ring 2 having a vertical axis X and constituted by two superposed annular plates $2a$ and $2b$, each shaped on the inside to have a folded-back rim given a respective reference $2a_1$ or $2b_2$, said two plates extending outwardly so as to form two diametrically opposite tabs $2c$ for the ring 2, each of the tabs $2c$ being pierced by a fixing hole $2c_1$;
- a thick elastomer wall 3 that is frustoconical about the axis X and that provides good resistance to axial compression, so as to act as a "support", said wall 3 connecting the base 1 in sealed manner to the ring 2 and flaring from said base towards the plate $2a$;
- a thin flexible bellows 4 connected in sealed manner to the ring 2, and co-operating with the ring, the wall 3, and the base 1 to define a housing;
- a rigid cap 5 for protecting the bellows 4, the periphery of said cap 5 being fixed to the ring 2;
- a rigid intermediate partition 6 subdividing the housing into two chambers, namely a working chamber A adjacent to the wall 3, and a compensation chamber B adjacent to the bellows 4;
- a constricted passage 7 interconnecting the two chambers A and B and formed in the periphery of the intermediate partition 6;
- a mass of liquid L filling the two chambers and the constricted passage; and
- a valve member 8 mounted between two grids 9 and 10 forming portions of the intermediate partition 6 such that the amplitude of axial displacements of the various points of the valve member is limited to a value of less than 1 mm, and preferably of the order of 0.5 mm, said valve member 8 being in the form of a circular-outline disk of elastomer.

The edge $2b_1$ surrounds the peripheral edges of the partition 6, the bellows 4, and the cap 5. The flexible bellows 4 is secured relative to the ring 2 by its periphery being clamped between the peripheral edge of the cap 5 and a peripheral zone of the partition 6. The partition 6, the bellows 4, and the cap 5 are secured for this purpose between the large base of the frustoconical wall 3 and the edge $2b_1$ by crimping the end periphery of the edge $2b_1$ onto the periphery of the cap 5.

The edge $2a_1$ of the plate $2a$ defines a truncated cone that flares towards its base that is furthest from the main portion of the plate. This edge $2a_1$ is embedded in the large base of the thick frustoconical wall 3.

The grids 9 and 10, and also the membrane 8 are all circular in outline and centered on the axis X.

Figure 4:
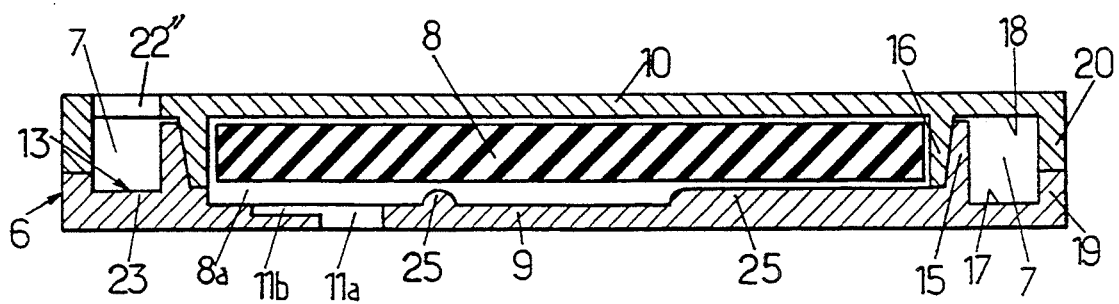
FIG. 4 is a section view through the grid of FIG. 2 on line IV—IV, also showing the valve member and the other grid of the FIG. 1 device.
Figure 2:
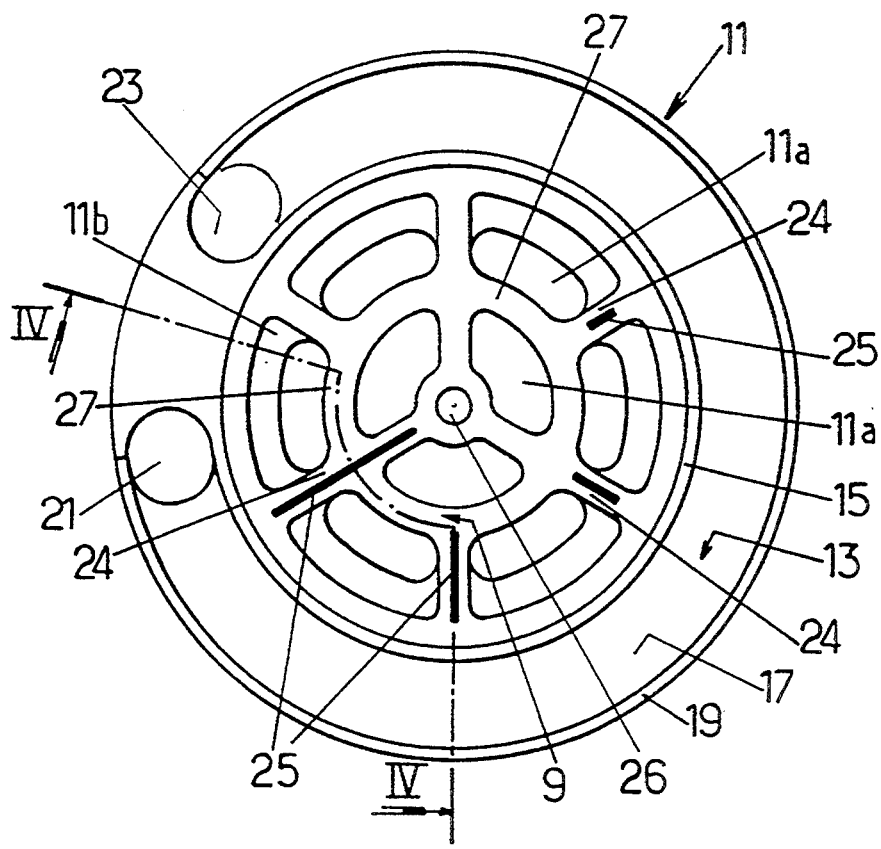
FIGS. 2 and 3 are respective plan views of each of the grids of the FIG. 1 device.
Figure 3:
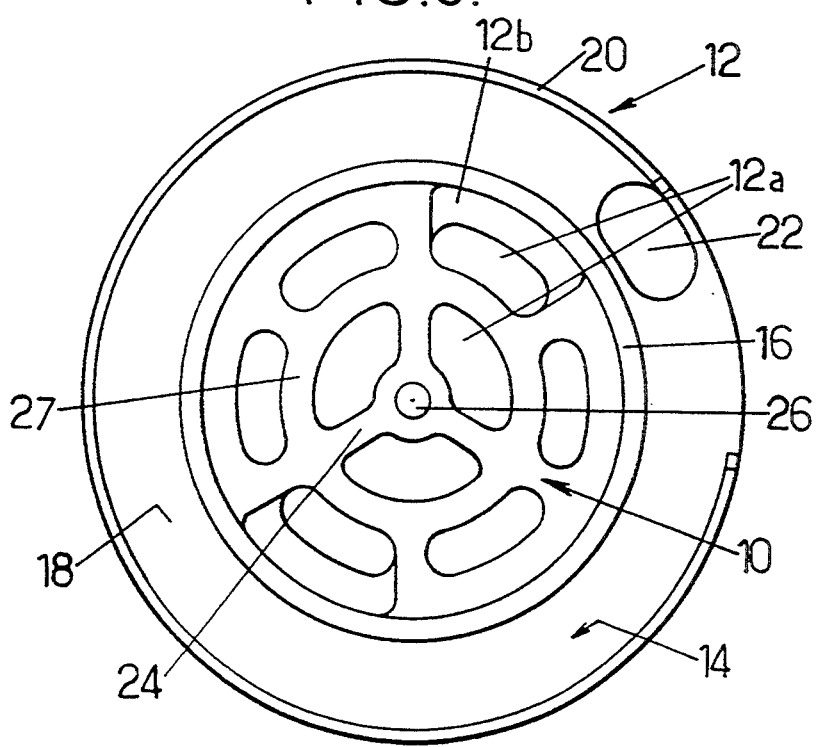

With reference more particularly to FIGS. 2 to 4, it can be seen that the intermediate partition 6 is mainly constituted by two complementary pieces 11 and 12 which are superposed and whose walls co-operate to define a housing $8a$ for the valve member 8, and also to define the constricted passage 7.

The piece 11 is constituted by the grid 9 whose outline is circular and by an annular groove 13 surrounding said grid 9. The groove 13 is delimited by an inside skirt 15 which surrounds the grid 9 in cylindrical manner, by a flat annular end wall 17, and by a skirt 19 surrounding the outer periphery of the end wall 17. The inner skirt 15 extends from the grid 9 and the end wall 17 over a height that corresponds substantially to the height of the housing $8a$ of the valve member 8. The height of the skirt 19 corresponds to half the height of the passage 7. An inlet/outlet opening 21 is formed through the end wall 17 for enabling the damping liquid to enter and escape from the constricted passage 7.

In similar manner, the piece 12 comprises a grid 10 and a groove 14 delimited by an end wall 18 and two skirts: an inner skirt 16 and an outer skirt 20. The end wall 18 has an inlet/outlet opening 22 passing therethrough.

The outer wall of the skirt 16 and the inner wall of the skirt 15 are both substantially frustoconical and of complementary outline. They engage one on the other, thereby providing sealed clamping when the pieces 11 and 12 are assembled together. The skirts 19 and 20 have the same diameter, with their free edges being held against each other in sealed manner by the above-mentioned clamping performed by the crimping of the edge $2b_1$.

The constricted passage 7 extends substantially all the way round the grids 9 and 10. The groove 13 is terminated at its end that is angularly furthest from the opening 21 by means of a wall 23 that is disposed substantially level with the opening 22, and that forms a sealed division between the ends of the passage 7. The skirt 22 is interrupted level with this division 23 and the opening 22. The opening $20a$ formed in this way through the skirt 20 is of dimensions that are complementary to the dimensions of the division 23, such that when the pieces 11 and 12 are assembled together, the opening $20a$ engages in sealed manner on the division 23.

Slots given respective references $11a$ and $12a$ are formed through the walls of the grids 9 and 10. These slots are uniformly distributed over the grids 9 and 10 around two main circumferences. Rings 27 and radial arms 24 of solid matter extend between the slots $11a$ and $12a$, these rings and arms constituting the bearing surfaces against which the faces of the valve member 8 come to bear. Each of the grids 9 and 10 has a central projection 26 with the valve member 8 being pinched between them.

The invention relates more particularly to the grids 9 and 10 and to the valve member 8.

Radial ribs 25 are distributed over the surfaces of the radial arms 24 of the grid 9 against which the valve member 8 is to bear, which ribs 25 extend towards the center of the grid 9 from the peripheral zone of the grid that receives the edge of the skirt 16. The arm 24 that is closest to the opening 21 carries a rib 25 that extends substantially all the way to the pinching projection 26 of the grid 9. The three arms 24 following it angularly in a given direction are provided with ribs 25 of length that decreases with increasing angle. The other two radial arms 24 of the grid, and in particular the arm which is closest to the opening 22 have no such ribs 25. The grid 10 does not carry any ribs. Thus, the ribs 25 are distributed in non-uniform manner and in non-repetitive manner around the axis.

The angular thickness of the ribs is about one millimeter, with the closest-together points of two successive ribs 25 being spaced apart by a distance of more than 10 millimeters. The angle between the outlines of two successive ribs 25 is thus greater than ten times the angle over which one such rib 25 extends.

During deformation of the valve member 8 this valve member is compressed progressively angularly about the ribs 25. The disposition of these ribs breaks the symmetries with which the valve member 8 moves. The phenomena of unwanted noise and banging due to discontinuities in the reciprocating displacement of the valve member, and in particular to the shocks of said valve member against the radial and annular bearing surfaces are considerably diminished. This reduction in the unwanted phenomena is accentuated by positioning the largest rib 25 close to an inlet/outlet (opening 21) of the constricted passage 7, and also by the fact that the grid 10 does not have any ribs.

Other variant embodiments are also possible. The ribs may be replaced by any other relief that is not repetitive relative to the axis of the grids and of the valve member, and in particular by studs. The studs which may be implemented by stamping the grids are advantageously in the form of spherical caps.

The non-uniform relief may also be carried by the valve member, with greater attenuation being obtained with relief that is carried by the grids, relief carried by a grid acting in the same way as a projection 26 to pinch the valve member.

Attenuation of banging and unwanted noise phenomena is also obtained when the surfaces in contact have no relief and present a general profile that is angularly non-uniform and non-repetitive all the way around the axis of the grids and of the valve member. Such a general profile is advantageously associated with relief that is angularly non-uniform and non-repetitive.

Progressive angular application of the valve member against said grids can also be achieved by having a valve member of non-uniform stiffness, with the non-uniformity in stiffness being non-repetitive relative to the above-mentioned axis. To this end, the valve member may be made of a material that is angularly uniform but that is of a thickness that varies angularly in a non-repetitive manner. Alternatively, it may be made of a material that is not uniform, with one or more inserts being distributed through the thickness of the valve member so that non-uniform stiffness is imparted thereto.

Experience shows that it is also particularly advantageous to provide set-back areas 11b, 12b or "spot faces" along at least some of the slots 11a, 12a in the grids, in their faces that face the valve member 8, which spot faces can be formed by milling or can be integrally molded with the corresponding grids: the surface discontinuities that result from such set-back zones reinforce the favorable bang-reducing effect of the asymmetrical relief.

Naturally, and as can be seen from the above, the invention is not limited in any way to the particular applications and embodiments that have been described more particularly. On the contrary, the invention extends to any variants thereof, and in particular to:

variants in which the valve member has an outline that is not circular, but that defines an axis analogous to an axis of revolution, e.g. a repetition axis (i.e. the outline of the valve member repeats after the valve member has been rotated through $2\pi/n$ about said axis, where n is an integer), and in particular variants in which the valve member is elliptical or rectangular in outline;

variants in which two damping devices are connected in parallel, a two-part valve member controlling communication between the chambers of said two devices;

variants in which the valve member between its two grids is not provided on the intermediate partition 6, but at a different location on the inside face of the working chamber A, and in particular in the vicinity of the base 1, in which case the valve member controls communication between the chamber A and a third chamber (not shown), said third chamber being likewise deformable and being defined for this purpose in particular by a sealed flexible membrane whose face outside the chamber in question defines an air chamber that may optionally be lined with foam or that may connect directly to the atmosphere;

variants in which the anti-vibration device in question is in the form of a sleeve that operates essentially along a diameter and in which the two rigid frame members are tubular, one inside the other, and are preferably circularly symmetrical and coaxial, at least under load;

variants in which one of the frame members constituting the damping device is in the form of a tube passing through the device, in which case the valve member is an annular plate surrounding said frame member; and variants in which the constricted passage is formed in portions of the device other than the periphery of the intermediate partition, and in particular through the central zone of the valve member itself.

We claim:

1. A hydraulic anti-vibration device designed to be interposed between two rigid elements, the device comprising:

two rigid frame members for securing to respective ones of the two rigid elements to be united;

an elastomer body interconnecting said two frame members and cooperating therewith to form, at least in part, two sealed chambers;

a constricted passage keeping said two sealed chambers permanently in communication with each other;

a mass of liquid filling said two sealed chambers and the constricted passage;

a valve member in the form of a plate of elastically deformable material defining in part at least one of said two sealed chambers and another chamber, said valve member having a central axis of revolution;

a grid limiting the displacements of said valve member; and non-uniform means for causing the valve member to be pressed against said grid in an angularly varying manner around said central axis during displacement of said valve member, said non-uniform means being distributed in a non-repetitive manner angularly around said central axis.

2. A device according to claim 1, wherein said non-uniform means include a non-repetitive, angular non-uniformity in at least one of the surfaces of said grid and of said valve member that come into mutual contact during displacements of said valve member.

3. A device according to claim 2, wherein said non-repetitive, angular non-uniformity is due to the presence of at least one piece of relief projecting relative to said grid.

4. A device according to claim 3, wherein a width of said at least one piece of relief extends over an angle about said central axis that is no greater than one-fifth of an angle formed between an outline of said at least one piece of relief and an outline of a closest adjacent relief.

5. A device according to claim 3, wherein at least one piece of relief is a rib.

6. A device according to claim 3, wherein said at least one piece of relief is a stud.

7. A device according to claim 2, wherein said non-repetitive angular non-uniformity is due to the shape of said grid.

8. A device according to claim 2, wherein said non-repetitive, angular non-uniformity is a contact surface of the grid.

9. A device according to claim 2, wherein said valve member is mounted between two grids and is capable of limited deformation, and said non-repetitive, angular non-uniformity is present on only one of said two grids.

10. A device according to claim 1, further comprising:
   slots formed through said grid on a face facing towards said valve member; and
   flat set-back areas provided along at least some of said slots.

11. A device according to claim 1, wherein said non-uniform means comprises a plurality of ribs, a longest of said plurality of ribs being closest to an opening of said constricted passage.

* * * * *